Figure 1:
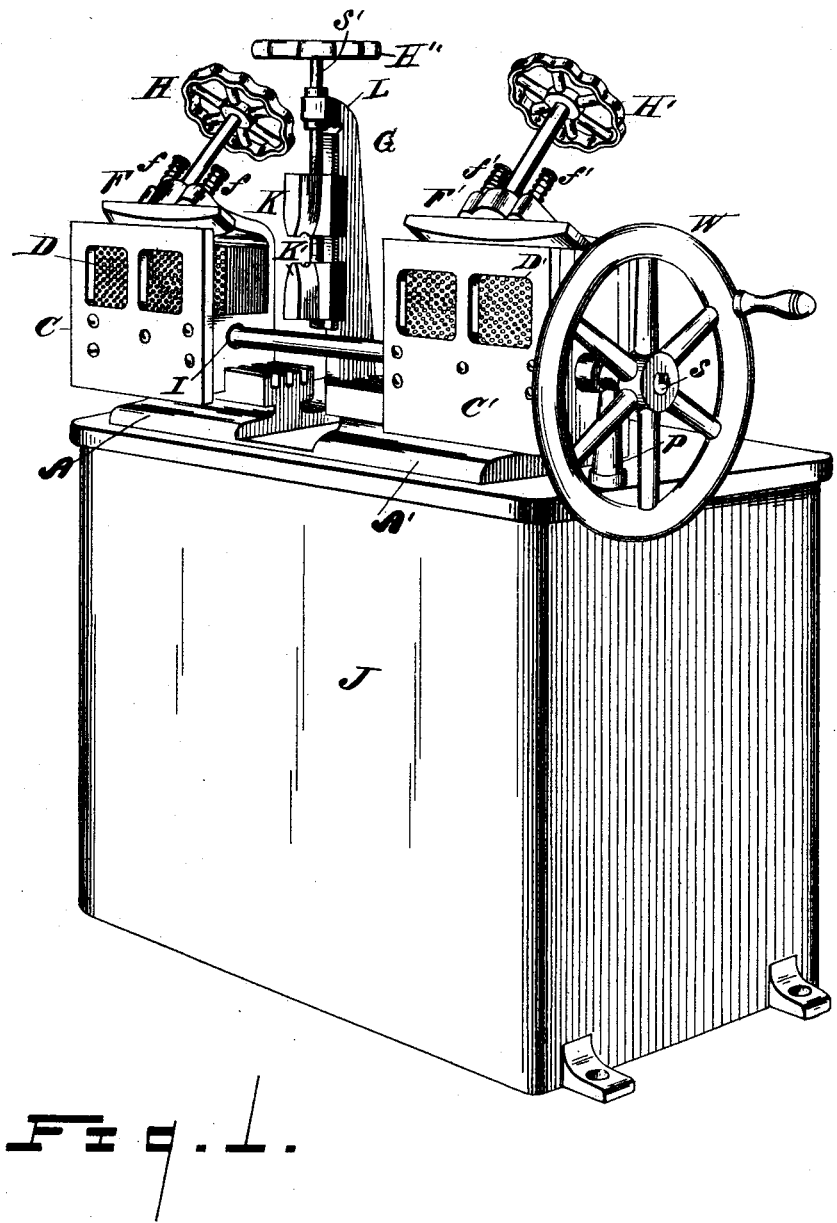

(No Model.) 2 Sheets—Sheet 1.

C. L. COFFIN.
PROCESS OF ELECTRIC WELDING.

No. 483,423. Patented Sept. 27, 1892.

WITNESSES

INVENTOR
Charles L. Coffin

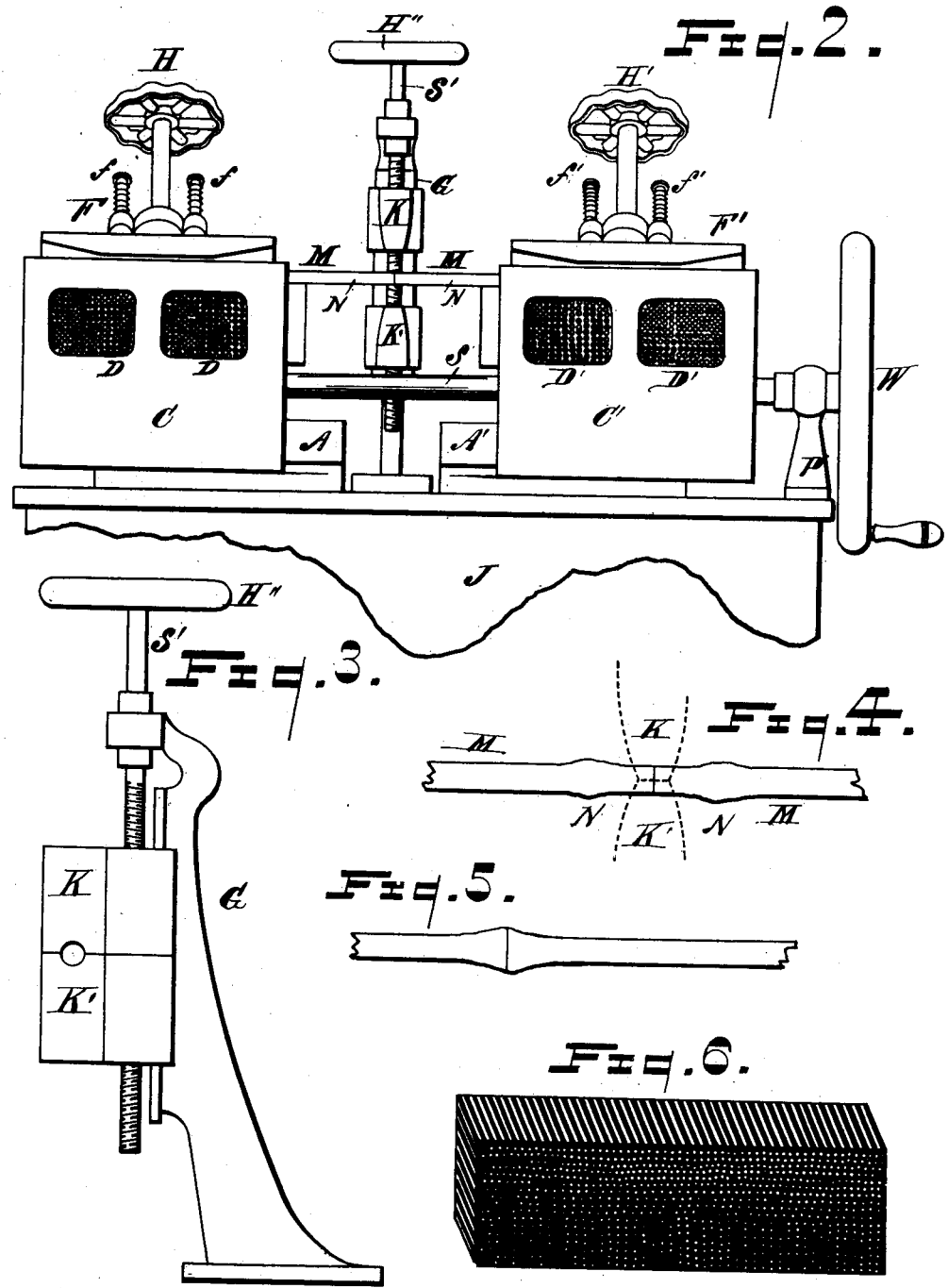

UNITED STATES PATENT OFFICE.

CHARLES L. COFFIN, OF DETROIT, MICHIGAN.

PROCESS OF ELECTRIC WELDING.

SPECIFICATION forming part of Letters Patent No. 483,423, dated September 27, 1892.

Application filed December 11, 1891. Serial No. 414,712. (No model.)

*To all whom it may concern:*

Be it known that I, CHARLES L. COFFIN, of Detroit, in the county of Wayne and State of Michigan, have invented a new and useful Improvement in Electrically Welding Metal, of which the following is a specification.

My invention consists in a mode of and apparatus for electrically welding metal, hereinafter fully described and claimed.

Figure 1 is a perspective of the complete machine. Fig. 2 is a front elevation with the base broken away. Fig. 3 is a side elevation of the welding clamp-block. Figs. 4 and 5 are views somewhat exaggerated of the forms taken by the metal in welding. Fig. 6 is a perspective of one of the perforated clamp-blocks.

J represents a case of any suitable material in which is contained a transformer or converter of any desired type, the secondary of said transformer or converter being open and ending in the terminals A and A' on the top of case J.

C and C' represent blocks arranged to slide upon the terminals A A' of the secondary, and connected together by an insulated right and left hand screw-threaded shaft S, which is tapped into said blocks, and which is provided with a hand-wheel W, journaled in a post P, by which said clamps C C' may be brought together or moved away from each other.

D represents perforated clamp-blocks, one of which is carried in each of the sliding blocks C C', and this feature will be made the subject of a separate claim in an application filed cotemporaneously herewith.

H and H' represent threaded bolts and hand-wheels, tapped through projections on the upper parts of blocks C C' and carrying at their lower ends followers F and F', between which and the blocks D and D' the articles to be welded are clamped.

*f f'* represent guide-rods on the followers F F', running through holes in the projection of blocks C C' and preferably encircled by spiral springs, as shown in the drawings, to automatically raise the follower-blocks F F' when the screw-bolts H H' are turned outward. Of course the screw-bolts H H' may be connected with the follower-blocks by a swiveled connection, so as to both raise and lower said blocks positively.

G represents a post carried on but insulated from the bed J of the machine, in the upper part of which is swiveled a right and left hand screw-threaded shaft S', provided with a hand-wheel H''. Screw-shaft S' engages with two blocks K and K', which run on guides on post G, as shown in Fig. 3, and the meeting portions of these blocks in the line of the weld are formed to fit the articles to be welded, as clearly shown in Fig. 3.

The operation of my invention is as follows: The two articles to be welded (represented by M M) are clamped between the followers F F' and perforated clamp-blocks D D', and then the blocks C C' are brought together so as to bring said articles M M nearly in contact, and absolutely so, if desired. By means of the screw-shaft S' clamping-blocks K K' are now closed upon the articles M M to hold them tightly and to make connection between them when not in contact. An electrical current is now passed through the converter in box J, by which the current passing through the terminals A A' of the secondary passes through the blocks C C', clamping-blocks D D', and thence through the articles to be welded, thus raising the temperature of said articles. In this operation the articles M M will tend to heat at the point marked N N, when by revolving screw-shaft S, leaving clamps K K' firmly closed upon the articles M M, the said articles are upset slightly at the points N N, as somewhat exaggerated at N N, Fig. 4, thus forming a swelling on each side of the joint instead of a depression, as is ordinarily the case in this process of welding. The clamps K K' are now slightly separated by means of the screw-shaft S', and the articles M M if not in contact are brought in contact and then pressed together, or if in contact are pressed together, thus forming a weld.

Under the present system of welding by incandescence, when a current traverses the joint directly the burr is often quite large, the heated portion back of the burr is short, and a reheat and second upsetting are necessary to form the finished weld. With this process this reheat is unnecessary, since the material is upset previous to the weld, and while still heated the weld made. The material is then in condition for swaging or drop-forging, having a sufficiently-long heated section, and this section containing sufficient metal to permit working without unduly reducing its cross-section. The upsetting also causes a somewhat-larger volume of current to play across the joint previous to the weld. When the articles M M are not in contact at the first upsetting, the clamps K K' furnish a path for the current.

What I claim as my invention, and desire to secure by Letters Patent, is—

1. The herein-described method of welding or working metals electrically, consisting in heating the metal by passing an electric current therethrough, upsetting each of said articles an appreciable distance back from the point of welding and not at the plane of junction, then bringing said articles in contact and passing a heating current therethrough, and then pressing the two articles to be welded together.

2. The herein-described process of welding metals electrically, consisting in first heating the articles to be welded by passing an electric current therethrough, then upsetting each of said articles an appreciable distance back of the place of welding and not at the plane of junction, then pressing said articles together to form a weld, and finally completing the weld by swaging, hammering, &c.

CHARLES L. COFFIN.

Witnesses:
GERTRUDE H. ANDERSON,
GEO. H. LOTHROP.